United States Patent

Rutten et al.

[11] Patent Number: 5,905,772
[45] Date of Patent: May 18, 1999

[54] X-RAY EXAMINATION APPARATUS WITH A SEMICONDUCTOR X-RAY DETECTOR

[75] Inventors: Walter Rutten, Linnich; Ulrich Schiebel; Herfried Wieczorek, both of Aachen, all of Germany; Norbert Conrads, Raeren, Belgium

[73] Assignee: U.S. Philips Corporation, New York, N.Y.

[21] Appl. No.: 08/889,273

[22] Filed: Jul. 8, 1997

[30] Foreign Application Priority Data

Jul. 8, 1996 [EP] European Pat. Off. .............. 96201899
Dec. 20, 1996 [EP] European Pat. Off. .............. 96203663

[51] Int. Cl.⁶ .................................................... H04N 5/00
[52] U.S. Cl. ......................................... 378/98.8; 378/98.3
[58] Field of Search .................................... 378/98.8, 98.2, 378/98.3, 98.7, 204, 207; 250/370.07, 370.09, 370.11

[56] References Cited

U.S. PATENT DOCUMENTS

| | | | |
|---|---|---|---|
| 4,359,759 | 11/1982 | McBride et al. | 358/111 |
| 4,737,653 | 4/1988 | Nakagawa et al. | 250/578 |
| 5,541,974 | 7/1996 | Sklebitz | 378/98.8 |
| 5,757,884 | 5/1998 | Alexandrescu | 378/98.8 X |

FOREIGN PATENT DOCUMENTS

0642264A1  8/1995  European Pat. Off. .

*Primary Examiner*—David P. Porta
*Attorney, Agent, or Firm*—Dwight H. Renfrew, Jr.

[57] ABSTRACT

An x-ray examination apparatus includes an x-ray source for emitting x-rays and an x-ray detector for deriving an image signal from an x-ray image. The x-ray detector has a semiconductor element including one or several sensor elements. Further the x-ray examination apparatus is provided with a bias radiation source for irradiating the x-ray detector with electromagnetic radiation. In particular, the x-ray detector is an x-ray sensor matrix having a multitude of semiconductor sensor elements. Preferably the bias radiation source is arranged to emit infrared radiation.

24 Claims, 2 Drawing Sheets

X-RAY EXAMINATION APPARATUS WITH A SEMICONDUCTOR X-RAY DETECTOR

BACKGROUND OF THE INVENTION

1. Field of the Invention

The invention relates to an x-ray examination apparatus comprising an x-ray source for emitting x-rays, an x-ray detector for deriving an image signal from an x-ray image, and including a semiconductor element.

2. Description of Related Art

Such an x-ray examination apparatus is known from the European patent application EP 0 642 264.

In the known x-ray examination apparatus the x-ray detector is an x-ray sensor matrix. The known x-ray examination apparatus is provided with a correction unit. The correction unit counteracts disturbances in the image signal which are caused by delayed emission of electric charges from the x-ray image sensor matrix. Incident x-rays release electric charge carriers, i.e. photocharges, notably photoelectrons, in the x-ray image sensor matrix and these electric charges are detected. The signal levels of the image signal represent the detected electric charges. A part of the electric charge carriers can be trapped in a trap-state, be retained in such a trap-state, and can escape from the trap-state at a later stage and are detected as electric charges with a delay. If the image signal with the disturbances were applied to a monitor for displaying the image information, not only the image information of the instantaneous image would be reproduced, but at the same time also image information of a previously picked-up image. As a result after-images would be displayed together with the instantaneous image.

The correction unit of the known x-ray examination apparatus utilizes an intricate mathematical model based on physical considerations for the trapping and subsequent release of electric charge carriers so as to correct disturbances due to electric charge carriers emitted in a delayed fashion. A drawback of the correction unit of the known x-ray examination apparatus is that the computations necessary to obtain the corrected image signal are rather complicated so that a powerful arithmetic unit is required. A rather fast and therefore quite expensive arithmetic unit is required to keep short the time which is needed for the correction of the image signal so as to render the known x-ray examination apparatus suitable for imaging rapid dynamic processes. Moreover, the required programming of the arithmetic unit is complicated, so that well educated staff is needed to set up the correction unit.

SUMMARY OF THE INVENTION

An object of the invention is to provide an x-ray examination apparatus comprising an x-ray detector in which disturbances of the image signal due to trapped electric charges are substantially avoided.

This object is achieved by an x-ray examination apparatus according to the invention which is characterised in that the x-ray detector is provided with a bias radiation source for irradiating the semiconductor element with electromagnetic radiation. The electromagnetic radiation from the bias radiation source generates electric charges in the semiconductor element in addition to electric charges that are generated due to the x-rays. The electric charges generated by the electromagnetic radiation from the bias radiation source are employed to occupy most of the trap-states. Thus it is avoided that electric charges which are generated due to the x-rays and represent brightness values of the x-ray image are trapped in the trap states. Because trapping of electric charges representing image information is avoided, subsequent release of such charges is substantially reduced. Hence, disturbances in the form of after-images being displayed together with the actual image are counteracted. It appears that hardly any disturbances due to delayed electric charges occur in the image signal so that there is hardly any or even no need to correct the image signal for such disturbances.

Just before x-irradiation to form the x-ray image, the amount of free electric charges is preferably made as low as possible in order to obtain a low noise level of the image signal. To that end, the x-ray detector is controlled to carry-off free electric charges just before the x-ray image is generated. In the sequel, such a separate discarding of electric charges is named electrical reset.

The semiconductor element may be substantially sensitive for x-rays. As an alternative the x-ray detector may be provided with a conversion element which derives low-energy radiation from x-rays, then the semiconductor element should be substantially sensitive for the low-energy radiation. The semiconductor element generates electric charges which are directly or indirectly caused by the incident x-rays. From these electric charges the image signal is derived by means of a read-out circuit. The x-ray detector may comprise a single semiconductor element from which electric charges are locally read-out by the read-out circuit. The x-ray detector may also be an x-ray sensor matrix in which the semiconductor element comprises a multitude of semiconductor sensor elements. Then, the read-out circuit is arranged to read-out electric charges from separate semiconductor sensor elements.

A preferred embodiment of an x-ray examination apparatus according to the invention is characterised in that the bias radiation source is arranged to emit electromagnetic radiation of an energy less than the bandgap energy of the semiconductor element.

Such sub-bandgap electromagnetic radiation, i.e. electromagnetic radiation having energy below the bandgap energy of the semiconductor element, excites electric charge carriers from the valence band to fill a substantial part of the trap-states, without generating electric charge carriers in the conduction band. Thus, additional noise due to free electric charges not representing image information of the x-ray image is avoided or at least substantially reduced. Hence, the use of sub-bandgap electromagnetic radiation to fill the trap-states allows omission of the electrical reset. Thus, it is possible to perform continuous fluoroscopy with an x-ray examination apparatus according to the invention.

A preferred embodiment of an x-ray examination apparatus according to the invention is characterised in that the bias radiation source is arranged to emit dark-red light or infrared radiation of an energy in the range of from 0.8 eV to 2.0 eV, in particular an energy of 1.3 eV.

A semiconductor element in which α-Si:H is employed as the photosensitive semiconductor material has a bandgap in the range of from about 1.7 eV to 2 eV. Hence, electromagnetic radiation in the form of dark-red light or infrared radiation having an energy in the range of from about 0.8 eV to 2.0 eV is particularly suitable to excite electric charge carriers from the valence band to most of the trap-states without generating free electric charge carriers in the conduction band. That is, dark-red light or near infrared radiation having a wavelength in the range of from about 620 nm to 1550 nm is suitable for filling the trap-states. Favourable results are in particular obtained with infrared radiation having a wavelength of about 950 nm.

A preferred embodiment of an x-ray examination apparatus according to the invention is provided with a control unit for controlling the x-ray source and the x-ray detector, and is characterised in that the control unit is arranged to pulse the bias radiation source, subsequently carry-off electric charges from the semiconductor element and after that energize the x-ray source.

In this mode of operation of the x-ray detector it is achieved that any free electric charges unintentionally generated by the electromagnetic radiation from the bias radiation source are carried-off during the electrical reset before the image signal is derived from the x-ray image. Hence, the noise level of the image signal is kept low.

Preferably, the control unit is arranged to control the read-out circuit so as to combine separate image signals relating to several x-ray pulses into a combined image signal. The combined image signal represents an x-ray image for which the x-ray exposure time is longer than the frame time minus the aggregate time for read-out of the electric charges generated due to a single x-ray pulse, irradiating with electromagnetic radiation from the bias radiation source, and subsequent electrical reset. The frame time is the time required for accumulating electric charges due to the x-rays or the low-energy radiation in the sensor elements and deriving the image signal from the accumulated electric charges, including the time needed for irradiating with electromagnetic radiation from the bias radiation source and the electrical reset. Before respective x-ray pulses the bias radiation source irradiates the semiconductor element, so as to occupy most of the trap-states and the electrical reset carries off most unintentionally generated free electric charges from the semiconductor element. This mode of operation achieves that the trap-states remain occupied during the successive x-ray pulses and that the number of spurious free electric charges is kept very low so as to reduce noise caused by electric charges that are not representing brightness values in the x-ray image. If the frame time were changed then variations would occur in the occupation of the trap-states. As the decay time of trap-states may be very long, e.g. in the order of minutes, such variations can give rise to substantial disturbances. Preferably, the frame time is kept fixed, so that variations in the occupation of the trap-states are avoided. So both disturbances in the form of after-images and noise in the image signal are avoided. Further, the electric charges generated in the semiconductor element are read-out when the x-ray source is not energized so that respective portions of the semiconductor element, notably sensor elements, will have generated electric charges due to the x-rays or the low-energy radiation for substantially equally long times.

A preferred embodiment of an x-ray examination apparatus according to the invention is provided with a control unit for controlling the x-ray source and the x-ray detector, and is characterised in that the control unit is arranged to pulse the bias radiation source in a regular sequence.

Thus, the electromagnetic radiation is delivered in a regular sequence to the semiconductor element. Preferably, the bias radiation source is synchronised with the pulses of the x-ray source and-or with the read-out of the electric charges. Consequently, a steady-state of the concentration of electric charge carriers filling trap-states is achieved. In particular, variations in the occupation of the trap-states are very well avoided. Both the density and fluctuations of unintentionally generated free electric charges due to the electromagnetic radiation from the bias radiation source are kept low. In particular, it is achieved that noise due such unintentionally generated free electric charges is at least a substantial factor or even an order of magnitude lower than the electronic noise that is generated during the read-out of the electric charges from the semiconductor element so as to derive the image signal. Notably, when sub-bandgap electromagnetic radiation is employed, the electrical reset can be omitted, so that the frame time can be shortened.

A preferred embodiment of an x-ray examination apparatus according to the invention is characterised in that the bias radiation source is positioned at the side of the x-ray detector remote from the x-ray source.

A preferred embodiment of an x-ray examination apparatus according to the invention in which the semiconductor element is disposed on a substrate, is characterised in that the bias radiation source is arranged to irradiate the semiconductor element through the substrate. On the substrate there are provided electronic components. For example, in the x-ray sensor matrix, the substrate carries read-out lines and switching elements for outputting or detecting electric charge carriers from the semiconductor element. The substrate also carries e.g. addressing lines to control the switching elements. Between such electronic components the substrate is transparent for the electromagnetic radiation. Thus, at least portions of the substrate allow electromagnetic radiation from the bias radiation source to pass so as to reach the semiconductor element. Owing to internal reflections in the x-ray detector the electromagnetic radiation is able to reach the semiconductor element from a wide range of directions. Usually, the substrate is at the side of the x-ray detector remote from the x-ray source. As the bias radiation source irradiates the semiconductor element via the substrate, the bias radiation source can be positioned at the end of the x-ray detector remote from the x-ray source. In that position, access for x-rays to the x-ray detector, notably the x-ray sensor matrix is not inhibited by the bias radiation source. Moreover, that position of the bias radiation source enables a compact design of the x-ray detector.

A preferred embodiment of an x-ray examination apparatus according to the invention is characterised in that the x-ray sensor matrix is provided with a diffusive reflector, the semiconductor element being positioned between the bias radiation source and the diffusive reflector.

The diffusive reflector substantially uniformly distributes electromagnetic radiation from the bias radiation source over the semiconductor element, notably over separate sensor elements of the x-ray sensor matrix. Thus, trap-states in the semiconductor element, notably in separate sensor elements are substantially uniformly filled with electric charge carriers. Further, the diffusive reflector achieves that electromagnetic radiation from the bias radiation source and x-rays or low-energy radiation from the conversion element arrive at the semiconductor element from substantially the same direction. Hence, the electromagnetic radiation generates electric charges which fill mainly those trap-states which would be filled by electric charges generated by the x-rays or the low-energy radiation if no electromagnetic radiation were applied.

A preferred embodiment of an x-ray examination apparatus according to the invention, in whcich the x-ray detector includes a conversion element for converting x-rays into low-energy radiation and the semiconductor element is arranged to derive electric charges from the low-energy radiation, is characterised in that the diffusive reflector is incorporated in the conversion element.

When the conversion element is a scintillator layer disposed on top of the semiconductor element, then the interface between the scintillator layer and the semiconductor element functions very well as such a diffusive reflector. The invention also relates to a method for deriving an image signal from an x-ray image by way of an x-ray sensor matrix comprising a plurality of sensor elements, the method comprising the steps of irradiating the sensor elements with electromagnetic radiation and carrying-off electric charges from the sensor elements and subsequently, converting an x-ray image into a low-energy radiation image, converting the low-energy radiation image into electric charges in the respective sensor elements and reading-out the electric charges from the sensor elements so as to form the image signal.

The electromagnetic radiation causes trap-states in the semiconductor element to be occupied. The carrying-off of electric charges from the semiconductor element removes most or even all free electric charges unintentionally generated by the electromagnetic radiation. Hence, such electric charges cannot contribute to the noise level of the image signal. Thus, the method achieves to avoid disturbances in the form of after-images in the image signal and also keeps the noise level of the image signal quite low. At option, the irradiation with electromagnetic radiation can be done at least partially simultaneously with the carrying-off of electric charges. Then the time required to prepare the x-ray detector for deriving the image signal from the x-ray image is quite short.

The invention is particularly useful when fluoroscopy is performed wherein a rapid succession of x-ray images at a low x-ray dose per image is performed after one or a few x-ray exposures at a high x-ray dose have been made. In particular, the image signals made during fluoroscopy are hardly affected by delayed electric charges that were trapped during the x-ray exposure.

BRIEF DESCRIPTION OF THE DRAWINGS

These and other aspects of the invention will be elucidated with reference to the embodiments described hereinafter and with reference to the accompanying drawing wherein.

DETAILED DESCRIPTION OF THE PREFERRED EMBODIMENTS

Figure 1:
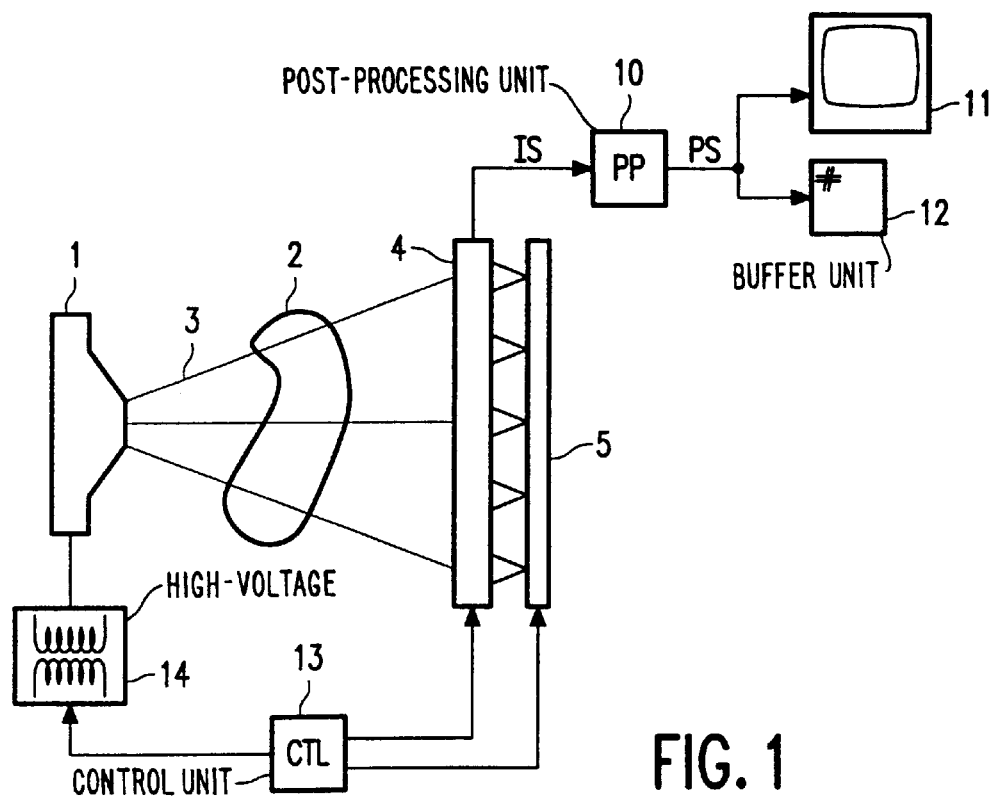
FIG. 1 schematically shows an x-ray examination apparatus in which the invention is used.

FIG. 1 schematically shows an x-ray examination apparatus in which the invention is used. The x-ray source 1 irradiates an object 2, notably a patient who is to be radiologically examined, with an x-ray beam 3. The x-ray detector is an x-ray sensor matrix. Owing to local variations of the x-ray absorption in the patient, the x-ray image is formed on the x-ray sensor matrix 4. From the x-ray image, the x-ray sensor matrix derives an image signal (IS) which is supplied to a post-processing unit 10. The post-processing unit removes any residual disturbances from the image signal and forms a processed image signal (PS). Such disturbances may e.g. be caused by local defects in the x-ray sensor matrix 4. The processed image signal (PS) is suitable to be employed for displaying image information from the x-ray image with a high diagnostic quality, that is small details having little contrast are rendered well visible. The processed image signal (PS) is supplied to a monitor 11 to display the image information, or the processed image signal (PS) can be supplied to a buffer unit 12 to await further processing or for archiving. Notably, the post-processing unit can be a rather simple hardware unit such as multipliers, arithmetic logical unit and a memory, because there are no complicated computations needed for correcting for disturbances due to delayed electric charges.

At the side of the x-ray sensor matrix 4 remote from the x-ray source 1, the bias radiation source is positioned. For example, the bias light source incorporates a number of semiconductor laser diodes, light emitting diodes or an electro-luminescent foil. The bias light source 5 is arranged to substantially uniformly irradiate the sensor elements of the x-ray sensor matrix with electromagnetic radiation, such as infrared radiation having an energy of 1.3 eV. The infrared radiation generates electric charge carriers in the sensor elements. These electric charge carriers are mainly used to occupy trap-states. Any free electric charges that are generated in the sensor elements by the infrared radiation are carried-off from the sensor elements by performing an electrical reset. The x-rays which form the x-ray image are converted into low-energy radiation, such as green light. In the sensor elements, the low-energy radiation generates electric charges which represent brightness values of the x-ray images. Because the trap-states are occupied, these electric charges are hardly or not at all trapped. The x-ray examination apparatus comprises a control unit 13 that is coupled to a high-voltage generator 14 which supplies a high-voltage to the x-ray source 1. The control unit 13 is also coupled to the x-ray sensor matrix and to the bias radiation source 5. The control unit controls the x-ray examination apparatus in that before an x-ray image is made the sensor elements are irradiated by the bias radiation source, any free electric charges are carried off and subsequently the x-ray source is energized to emit the x-ray beam. In a pulsed mode of operation, the control unit repeats such a sequence until a desired x-ray dose has arrived on the x-ray sensor matrix.

Figure 2:
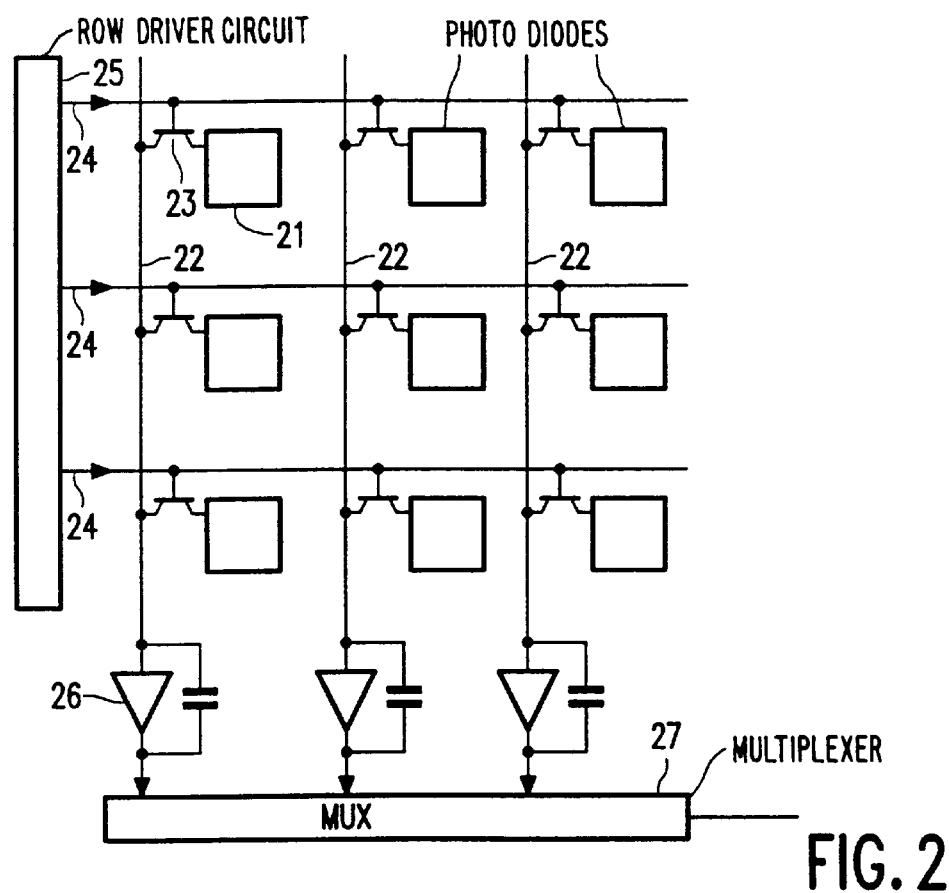
FIG. 2 schematically shows a plan view of the x-ray sensor matrix of the x-ray examination apparatus of the invention.

FIG. 2 schematically shows a plan view of the x-ray sensor matrix of the x-ray examination apparatus of the invention. As an example a matrix of 3×3 sensor elements 21 is shown, but in practice an x-ray sensor matrix may comprise e.g. 200×200, or even 1 k² or 2 k² sensor elements. Each column of sensor elements is coupled to a read-out line 22 via a switching element 23 such as a thin-film transistor. The switching elements 23 are controlled via addressing lines 24 for respective rows of sensor elements 21. A row driver circuit 25 is coupled to the addressing lines 24 to supply addressing signals which control the switching elements 23. To read-out the sensor elements 21, addressing signals are supplied along successive addressing lines 24 to close the switching elements 23 of respective rows. The electric charges in the sensor elements 21 are read-out via the read-out lines 22 to respective integrating amplifiers 26 that are provided for each read-out line 22. The integrating amplifiers convert the electric charges read-out form the sensor elements into electric voltages. The voltages from the integrating amplifiers are supplied to a multiplexer 27 which derives the image signal from the voltages of each of the integrating amplifiers 26. Therefore, the read-out lines, switching elements, integrating amplifiers and multiplexer are part of the read-out circuit. The row driver circuit 25 and the addressing lines 24 are coupled to the control unit 13 so as to control read-out and/or carrying-off electric charges. Preferably, electric charges are carried-off in that they are drained to a substrate 30 of the x-ray semiconductor matrix. The electric charges can as an alternative be carried-off via the read-out lines.

Figure 3:
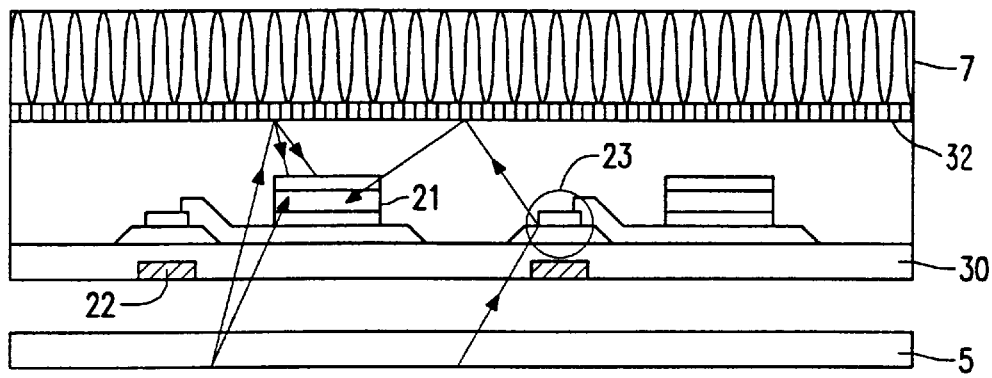
FIG. 3 schematically shows a cross section of the x-ray sensor matrix of the x-ray examination apparatus of the invention.

FIG. 3 schematically shows a cross section of the x-ray sensor matrix of the x-ray examination apparatus of the invention. On the substrate 30 there are disposed the thin-film transistors 23 and photodiodes 21, which form the sensor elements. Notably, instead of photodiodes there may be employed semiconductor photoconducting elements or phototransistors as the sensor elements. In particular photodiodes have a simple structure and are therefore easy to manufacture. The photodiodes form the sensor elements which convert incident radiation such as light or infrared radiation into electric charges. In particular a pin-diode structure is suitable to form such a photodiode. The thin-film transistors 23 form switching elements which couple the photodiodes to respective read-lines 22. The x-ray sensor matrix also comprises a conversion element 7 in the form of a scintillation layer of e.g. CsI:T1. Preferably, the CsI:T1 is deposited in the form of columnar crystals so as to improve the spatial resolution of the x-ray sensor matrix. Such a scintillation layer converts incident x-rays into green light for which the photodiodes are substantially sensitive. Between the photodiodes 21 and the scintillator layer there can be disposed a diffusive reflector 32. Instead of a separate diffusive reflector, also the face of the scintillation layer facing the photodiodes can be employed for the diffusive reflection of electromagnetic radiation from the bias radiation source. The diffusive reflector can as an alternative be placed on the face of the scintillator layer which faces the x-ray source.

Electromagnetic radiation, notably infrared radiation, from the bias radiation source 5 can pass through the substrate 30 and portions of the structure forming the photodiodes and thin-film transistors, read-out lines and addressing lines. The infrared radiation may reach the photodiodes directly, or via various reflections. In particular, the infrared radiation from the bias radiation source 5 is diffusely reflected at the diffusive reflector 32 or the face of the scintillation layer 7 so as to substantially uniformly irradiate the photodiodes with the infrared radiation.

Figure 4:
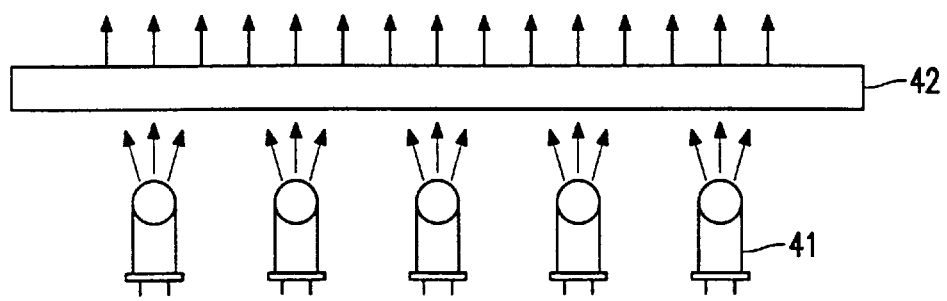
FIG. 4 schematically shows some details of the bias light source.

FIG. 4 schematically shows some details of the bias light source. An array of semiconductor laser diodes 41 is arranged to emit dark-red light or infrared radiation onto a diffusive screen 42. The diffusive screen 42 is for instance a roughened glass plate. The diffusive screen 42 forms a substantially uniform intensity distribution that is used to irradiate the semiconductor element 21 of the x-ray detector.

We claim:

1. An x-ray examination apparatus comprising
   an x-ray source for emitting x-rays for forming an x-ray image, and
   an x-ray detector for deriving an image signal from the x-ray image, said x-ray detector comprising
      a semiconductor element for generating electric charges caused by x-rays from the x-ray source, and
      a bias radiation source for irradiating the semiconductor element with electromagnetic radiation of an energy less than the bandgap energy of the semiconductor element.

2. The apparatus of claim 1 wherein the x-ray detector includes a conversion element for converting x-rays into low-energy radiation and the semiconductor element is arranged to generate electric charges from the low-energy radiation.

3. An x-ray examination apparatus as claimed in claim 1, wherein the bias radiation source is arranged to emit dark-red light or infrared radiation of an energy in the range of from 0.8 eV to 2.0 eV.

4. The apparatus of claim 3 wherein bias radiation source is arranged to emit radiation with an energy of 1.3 eV.

5. The apparatus of claim 3 wherein the semiconductor element comprises amorphous hydrogenated silicon.

6. An x-ray examination apparatus as claimed in claim 1, wherein the bias radiation source is positioned at the side of the x-ray detector remote from the x-ray source.

7. An x-ray examination apparatus as claimed in claim 1, wherein the semiconductor element is disposed on a substrate, and the bias radiation source is arranged to irradiate the semiconductor element through the substrate.

8. An x-ray examination apparatus as claimed in claim 7, wherein the x-ray sensor matrix is provided with a diffusive reflector, the semiconductor element being positioned between the bias radiation source and the diffusive reflector.

9. An x-ray examination apparatus as claimed in claim 8, and wherein the x-ray detector includes a conversion element for converting x-rays into low-energy radiation and the semiconductor element is arranged to derive electric charges from the low-energy radiation, and the diffusive reflector is incorporated in the conversion element.

10. The apparatus of claim 1 wherein the semiconductor element is sensitive to x-rays for the direct generation of electric charge.

11. An x-ray examination apparatus as claimed in claim 1, further comprising a control unit for controlling the x-ray source and the x-ray detector, which control unit is arranged to pulse the bias radiation source in a regular sequence.

12. An x-ray examination apparatus as claimed in claim 1, further comprising a control unit for controlling the x-ray source and the x-ray detector, which control unit is arranged to pulse the bias radiation source, subsequently carry-off electric charges from the semiconductor element, and after that energize the x-ray source.

13. An x-ray examination apparatus as claimed in claim 12, wherein the control unit is further arranged to pulse the bias radiation source in a regular sequence.

14. An x-ray examination apparatus comprising
    an x-ray source for emitting x-rays for forming an x-ray image,
    an x-ray detector for deriving an image signal from the x-ray image, said x-ray detector comprising
       a semiconductor element for generating electric charges caused by x-rays from the x-ray source, and
       a bias radiation source for irradiating the semiconductor element with electromagnetic radiation, and
    a control unit for controlling the x-ray source and the x-ray detector, which control unit is arranged to pulse the bias radiation source, subsequently carry-off electric charges from the semiconductor element, and after that energize the x-ray source.

15. An x-ray examination apparatus as claimed in claim 14, wherein the control unit is further arranged to pulse the bias radiation source in a regular sequence.

16. The apparatus of claim 14 wherein the bias radiation source is arranged to emit electromagnetic radiation of an energy less than the bandgap energy of the semiconductor element.

17. The apparatus of claim 14, wherein the bias radiation source is arranged to emit dark-red light or infrared radiation of an energy in the range of from 0.8 eV to 2.0 eV.

18. The apparatus of claim 17 wherein the semi conductor element comprises amorphous hydrogenated silicon.

19. The apparatus of claim 14 wherein the control unit is further arranged so that the bias radiation pulses cause most trap states present in the semiconductor element to be occupied.

20. A method for deriving an image signal from an x-ray image by way of an x-ray sensor matrix comprising a plurality of semiconductor sensor elements, the method comprising the steps of:

irradiating the semiconductor sensor elements with electromagnetic bias radiation, and carrying-off electric charges from the semiconductor sensor elements and subsequently, converting an x-ray image into electric charges in the respective semiconductor sensor elements, and reading-out the electric charges from the semiconductor sensor elements so as to form the image signal.

21. The method of claim 20 wherein the electromagnetic bias radiation is of an energy less than the bandgap energy of the semiconductor sensor elements.

22. The method of claim 20 wherein the step of converting an x-ray image into electric charges comprises converting first an x-ray image into a low-energy radiation image, and converting second the low-energy radiation image into electric charges in the respective semiconductor sensor elements.

23. The method of claim 20 wherein the step of converting an x-ray image into electric charges comprises directly converting an x-ray image into electric charges in the respective semiconductor sensor elements.

24. The method of claim 20 wherein the irradiating of the semiconductor element is arranged to cause most trap states present in the semiconductor element to be occupied.

* * * * *